United States Patent [19]
Baillie

[11] 4,081,249
[45] Mar. 28, 1978

[54] CHEMICAL CONVERSION APPARATUS AND METHOD

[75] Inventor: Lloyd A. Baillie, Homewood, Ill.

[73] Assignee: Atlantic Richfield Company, Philadelphia, Pa.

[21] Appl. No.: 660,207

[22] Filed: Feb. 23, 1976

[51] Int. Cl.² .................. B01D 45/12; B01J 8/24; B01J 37/12; C10G 13/18

[52] U.S. Cl. .................. 23/288 S; 23/288 B; 55/1; 55/392; 55/449; 55/458; 55/459 R; 208/164; 252/417

[58] Field of Search .......... 23/288 B, 288 S, 288 E, 23/284 US; 55/447, 448, 449, 450, 456, 457, 459 R, 462, 465; 208/113, 164; 252/417

[56] References Cited
U.S. PATENT DOCUMENTS

| | | | |
|---|---|---|---|
| 1,055,792 | 3/1913 | Plock | 55/459 X |
| 2,338,779 | 1/1944 | Nutch | 55/459 X |
| 2,400,645 | 5/1946 | Huff | 23/288 S UX |
| 2,402,845 | 6/1946 | Rodman | 55/449 X |
| 3,006,693 | 10/1961 | Claunch, Jr. et al. | 23/288 S X |
| 3,466,853 | 9/1969 | Buick et al. | 55/449 X |

Primary Examiner—Joseph Scovronek
Attorney, Agent, or Firm—Frank J. Uxa

[57] ABSTRACT

Improved apparatus for carrying out catalytic chemical conversion and restoring the catalytic activity of solid particles previously used to promote chemical conversion involve improved devices to at least partially separate solid particles-vapor mixtures. These improved devices include, for example, properly positioned arresting vanes, flow reversal systems and/or plates, and provide for reduced attrition of the solid catalyst particles.

Improved methods employing such apparatus are also disclosed.

97 Claims, 9 Drawing Figures

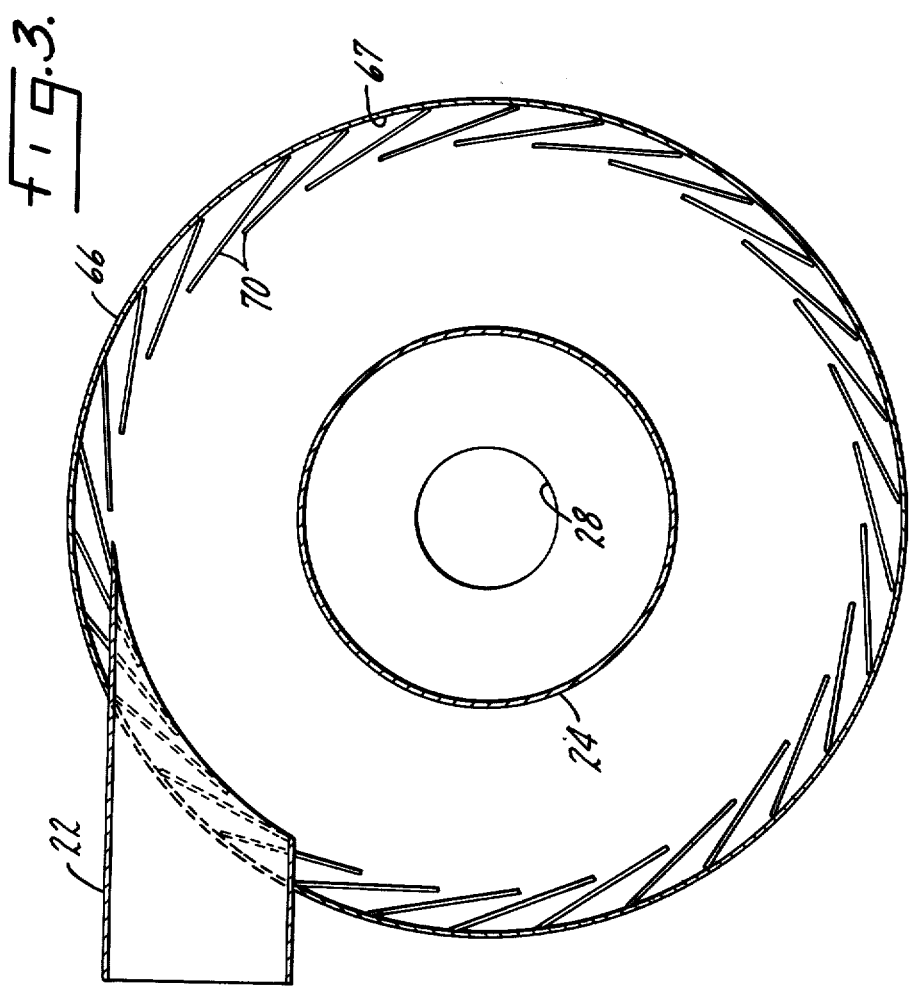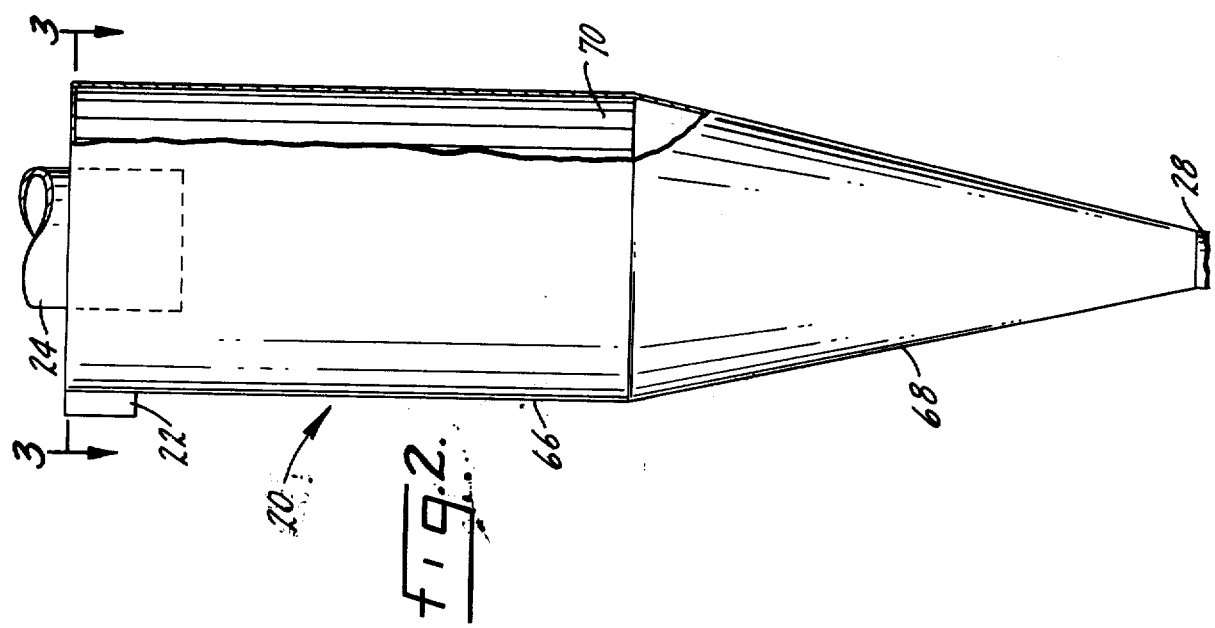

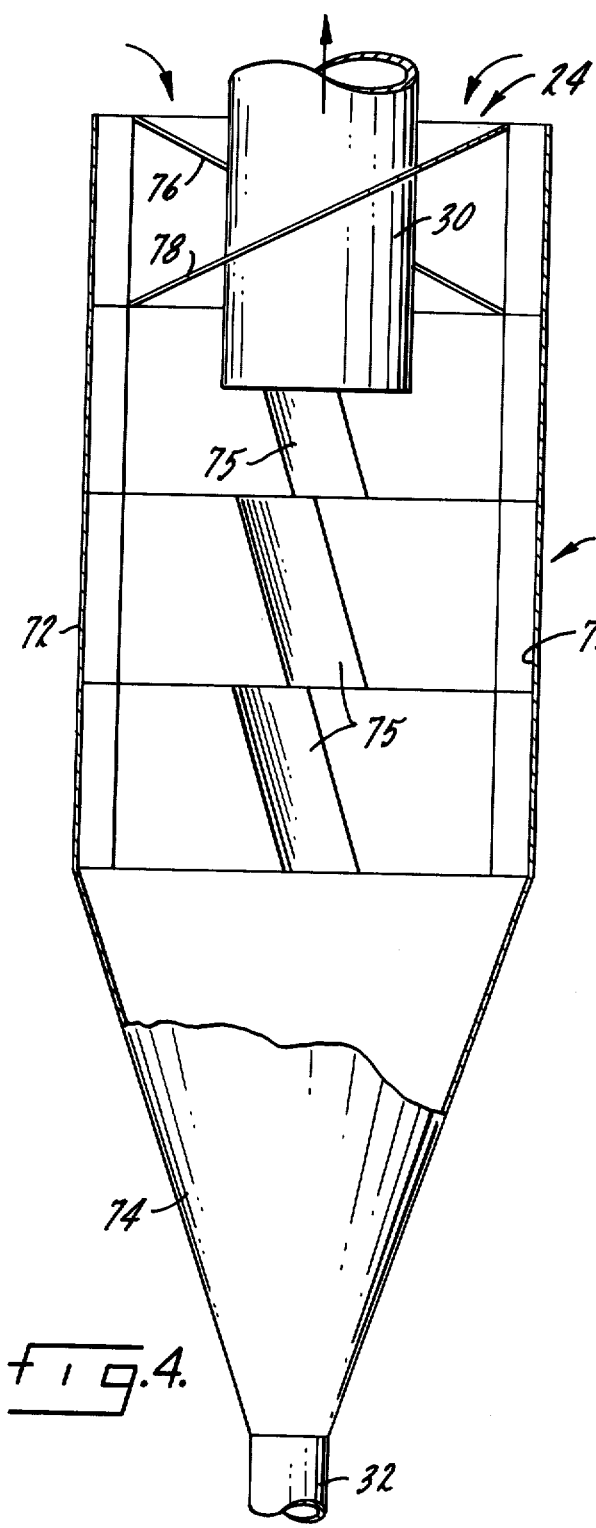
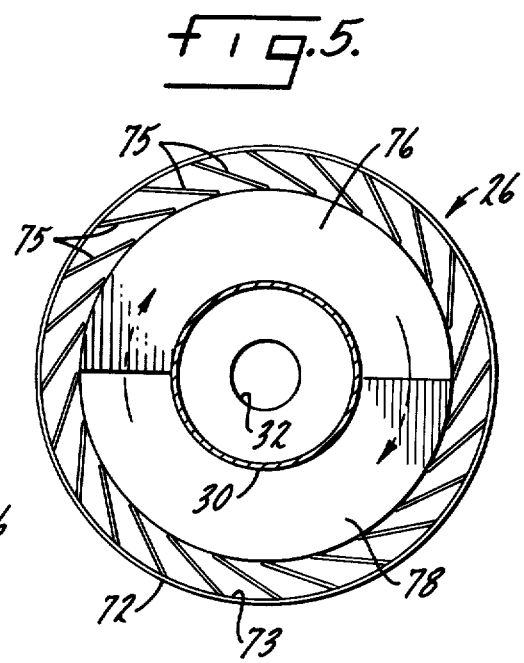
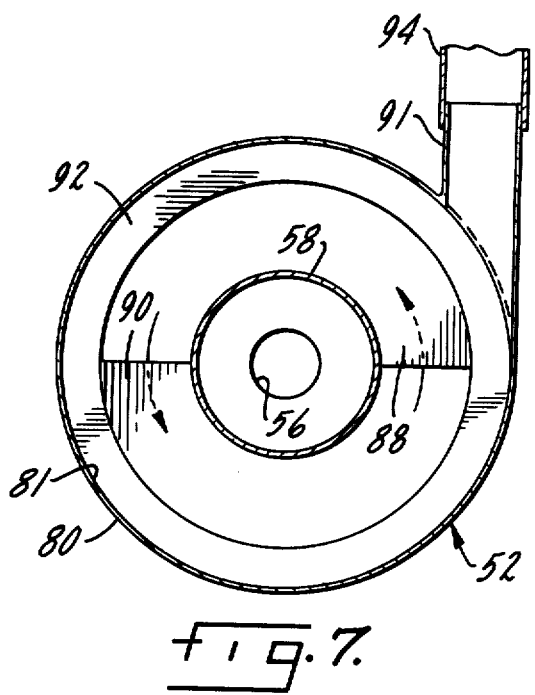

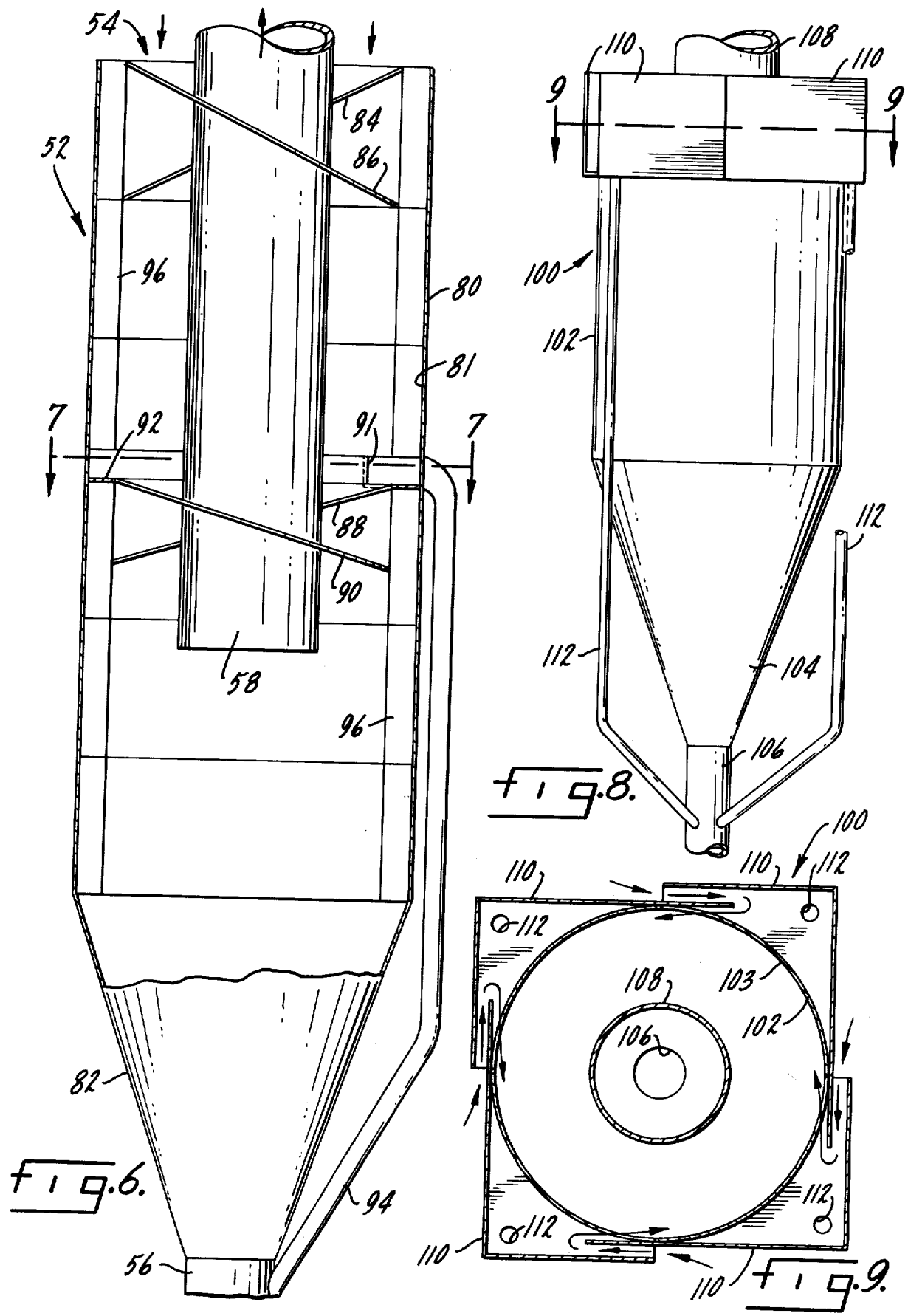

CHEMICAL CONVERSION APPARATUS AND METHOD

This invention relates to improved apparatus and methods for carrying out chemical conversions and for restoring the catalytic activity of solid particles used to promote chemical conversions. More particularly, the invention relates to such improved apparatus and methods for carrying out chemical conversions and for restoring the catalytic activity of solid particles used to promote such conversions wherein mixtures of solid particles and vapor require separation.

In many instances throughout the process industries, chemical reactions occur which are promoted by relatively small, e.g., diameters ranging from about 10 to about 500 microns, catalyst particles, for example, in fluidized bed reactors. One process involving such catalyst particles is the catalytic cracking of higher boiling hydrocarbons to gasoline and other lower boiling components which is used extensively in the petroleum industry. Often, apparatus used for carrying out such chemical conversion, e.g., cracking, of a feedstock, e.g., hydrocarbon gas oil, involves a reaction zone where the relatively small catalyst particles and feedstock are contacted at chemical conversion, e.g., hydrocarbon cracking, conditions to form at least one chemical conversion product, e.g., hydrocarbons having a lower boiling point than the hydrocarbon feedstock. Often, while promoting the desired chemical conversion, the catalyst particles have deposited thereon material, e.g., carbon, coke and the like, which acts to reduce the catalytic activity of these particles. Apparatus which are used to restore the catalytic activity of such particles often include a regeneration zone where the deposit-containing solid particles are contacted with oxygen-containing vapor at conditions to combust at least a portion of the deposit material.

Operation of both of the systems referred to above involves the formation of a mixture of solid particles and vapor which requires separation. Therefore, both the apparatus for carrying out chemical conversion and the apparatus for restoring the catalytic activity of the solid catalyst particles include a separation zone wherein the mixture of solid particles and vapor formed in the reaction and regeneration zone, respectively, are at least partially separated. Such separation zones often involve conventional cyclone precipitators.

However, processing solid catalyst particles through such cyclone precipitators causes increased particle attrition. That is, the solid catalyst particles have an increased tendency to fall apart and/or form fines while being processed through a separation system, e.g., cyclone precipitator. The resulting particle "fines" are often of such a size that they cannot be reused to promote chemical conversion. Clearly, it is advantageous to provide for reduced attrition of solid catalyst particles.

Therefore, one object of the present invention is to provide apparatus and methods for carrying out chemical conversion, e.g., cracking, of a feedstock, e.g., hydrocarbon, using solid catalyst particles wherein attrition of the particles is reduced.

Another object of the present invention is to provide apparatus and methods for restoring the catalytic, e.g., hydrocarbon cracking, activity of solid catalyst particles wherein attrition of the particles is reduced. Other objects and advantages of the present invention will become apparent hereinafter.

In one embodiment, the present invention involves an improved apparatus for carrying out chemical conversion of a feedstock. This apparatus includes a chemical reaction zone wherein the feedstock, e.g., a substantially hydrocarbon gas oil, is contacted with solid particles capable of promoting chemical conversion, e.g., hydrocarbon cracking, at chemical conversion conditions to form at least one chemical conversion product and a mixture of solid particles and vapor, the major portion, preferably at least about 90%, by weight of the solid particles having diameters in the range from about 10 to about 500 microns, preferably from about 20 to about 200 microns; and at least one separation means in fluid communication with the reaction zone, wherein the mixture of solid particles and vapor is at least partially separated. The separation means comprises a chamber defined by an interior cylindrical surface; an inlet means to the chamber in fluid communication with both the reaction zone and the chamber to allow entry of the solid particles-vapor mixture to the chamber, wherein movement of the mixture causes solid particles to preferentially move toward the cylindrical surface; a particle outlet means from the chamber to allow at least a portion of the solid particles of the mixture to exit the chamber; and a fluid outlet means from the chamber to allow at least a portion of the vapor component of the mixture to exit from the chamber. In one embodiment, the present improvement involves arresting means located in spaced relation to, and preferably attached to, the interior cylindrical surface to slow the velocity of at least a portion of the solid particles as the solid particles preferentially move toward the cylindrical surface, thereby inhibiting the attrition of the solid particles.

An improved method of chemical conversion, e.g., hydrocarbon cracking, utilizing such improved apparatus has also been discovered.

In an additional embodiment, the present invention involves an apparatus for restoring the catalytic activity of solid particles which have previously been used to promote chemical conversion, e.g., hydrocarbon cracking, and have deactivating carbonaceous deposit material thereon, the major portion, preferably at least about 90%, by weight of the solid particles having diameters in the range from about 10 to about 500 microns, preferably from about 20 to about 200 microns. This apparatus includes a regeneration zone wherein the deposit-containing solid particles are contacted with oxygen-containing vapor under conditions to combust at least a portion of the deposit material and form a mixture of solid particles and vapor; and at least one separation means in fluid communication with the regeneration zone wherein the solid particles-vapor mixture is at least partially separated. The separation means comprises a chamber defined by an interior cylindrical surface; an inlet means to the chamber in fluid communication with both the regeneration zone and the chamber to allow entry of the mixture to the chamber wherein movement of the mixture in the chamber causes solid particles to preferentially move toward the cylindrical surface; a particle outlet means from the chamber to allow at least a portion of the solid particles of the mixture to exit from the chamber; and a fluid outlet means from the chamber to allow at least a portion of the vapor component of the mixture to exit from the chamber. The present improvement provides for arresting means located in spaced relation to, and preferably attached to, the interior cylindrical surface to slow the velocity of at least a portion of the solid particles as the solid particles preferentially move toward the cylindrical surface, thereby inhibiting the attrition of the solid particles.

An improved method for restoring the catalytic activity of solid particles utilizing this improved apparatus has also been found.

Each of the arresting means described above preferably involves a plurality of vanes, each of which vanes is attached to the interior cylindrical surface and extend a distance, more preferably a substantially equal distance, toward the central axis of the chamber. Thus, in a more preferred embodiment, the end of each of the vanes away from the interior cylindrical surface is at a substantially equal distance from the central axis of the chamber. These vanes form channels or spaces through which at least a portion of the solid particles preferentially moving toward the cylindrical surface flow. Further, the vanes are preferably positioned so that each vane overlaps at least one adjacent vane when viewed from the central axis of the chamber.

A still further preferred embodiment involves arresting means comprising such a plurality of vanes each of which is inclined at a predetermined, more preferably a substantially uniform, angle relative to the central axis of the chamber. The angle of incline is chosen so that the resistance to flow of the mixture of solid particles and vapor in the chamber is reduced. In other words, the vanes are preferably inclined in the general direction of spiralling flow of this mixture past the vanes to reduce the flow resistance caused by these vanes. The inclined vanes also act to urge solid particles in the proximity of the cylinrical surface of the chamber downwardly and, thus, provide improved solid particle-vapor separation. This feature of the present invention provides additionally improved solid particle attrition inhibition.

The relative sizes of the components of the present apparatus may be varied depending on the particular application involved. For example, the reaction zone and regeneration zone may each have a volume ranging from about 10 cubic feet or less to about 100,000 cubic feet or more, preferably from about 100 to about 50,000 cubic feet. The chamber of the present separation means typically may have an inside diameter ranging from about 0.1 to about 10 feet or more, preferably from about 1 to about 7 feet, and a length ranging from about 0.5 to about 50 feet or more, preferably from about 5 to about 35 feet.

The apparatus of the present invention include at least one separation means. However, often the apparatus involves a plurality, more preferably from about 3 to about 15, of such separation means in direct fluid communication with either the reaction zone or the regeneration zone. "Direct fluid communication" as used herein refers to communication wherein the mixture of solid particles and vapor flows directly from the reaction zone, or regeneration zone into the separation means. This is in contrast to the situation wherein staged separators, e.g., two or more separation means in series, are employed. The second and following separation means, if any, in series are not in direct fluid communication with the reaction zone or regeneration zone. However, the present improved separation means may advantageously be used as either the first and/or succeeding separation means in such a series.

The inlet means of the present separation means may involve a conduit in fluid communication with both the reaction zone, or regeneration zone, and the chamber. Although the conduit may empty into the chamber from any convenient angle, preferably this conduit empties substantially parallel to the central axis of the chamber, e.g., top inlet to a chamber situated so that its central axis is substantially vertical, or substantially tangential to the interior cylindrical surface of the chamber.

When entry to the chamber from the conduit is substantially parallel to the central axis, the inlet means, for example, may further comprise flow directing means located in spaced relation to the interior cylindrical surface and acting to direct the flow of the solid particles-vapor mixture in the chamber so that at least a portion of solid particles preferentially move toward the cylindrical surface. In a preferred embodiment, the flow directing means involve a pair of partial baffles situated, e.g., at mutually inclined angles, so that as the mixture of solid particles and vapor from the conduit passes the baffles, the mixture is caused to flow in a generally spiralling path through the chamber.

The present separation means may include flow redirecting means, preferably a pair of partial baffles in spaced relation, e.g., attached, to the interior cylindrical surface at a distance along this cylindrical surface, e.g., below the inlet means, to redirect the flow of the mixture of solid particles and vapor in the chamber in a generally spiralling fashion through the remainder of the chamber. Such flow redirecting may be employed in the present separation means regardless of the angle at which the solid particles-vapor mixture enters the chamber from the inlet means even when the conduit of the inlet means empties substantially tangentially to the interior cylindrical surface of the chamber.

In one preferred embodiment, the present separation means further comprises velocity altering means. Such means preferably involve at least one pair of partial baffles located in spaced relation, e.g., attached, to the interior cylindrical surface below the inlet means. This pair of baffles is situated, e.g., at mutually inclined angles, so that as the mixture of solid particles and vapor passes the baffles, the baffles change, preferably increase, the radial component of the velocity of the mixture. The angle of incline between the partial baffles primarily determines the magnitude of the radial velocity component, all other things being equal. The greater the angle of incline between the partial baffles (in other words the more horizontal the baffles in a vertical chamber), the greater the radial velocity component. Improved separation of solid particles and vapor is achieved at increased radial velocities. However, such increased velocities tend to increase particle attrition. Therefore, the present apparatus involving at least one velocity altering means preferably provides for separation of a portion, preferably a major portion, of the solid particles at relatively low radial velocities, e.g., before the mixture of solid particles and vapor pass the velocity altering means. Increased radial velocities allow improved separation of the particles from the remaining mixture. Thus, the improved apparatus described above provides improved separation while, at the same time, inhibiting solid particle attrition.

In a still further preferred embodiment, the inlet means involves at least one flow reversal means in fluid communication with both the reaction zone or regeneration zone and the inlet conduit. The flow reversal means acts to substantially change, preferably substantially reverse, the direction of flow of the mixture of solid particles and vapor prior to this mixture entering the conduit. Such change, preferably reversal, in the direction of flow of this mixture causes a portion of the solid particles to separate from the mixture. Since these separated particles are not subjected to the attrition causing conditions in the chamber of the separation means, overall particle attrition is reduced. In this embodiment, the present apparatus preferably includes particle withdrawal means in fluid communication with the flow reversal means which allows at least a portion of the solid particles separated in the flow reversal means to be withdrawn. In one embodiment, the particle withdrawal means is in fluid communication with the particle outlet means of the present separation means so that the separation means provides a single stream of separated particles. Of course, the withdrawal means need not be so connected. Although the present flow reversal means is particularly useful in separation means including the present arresting means, such arresting means need not be included. Even without such arresting means, a separation means which includes the present flow reversal means provides substantial catalyst particle attrition inhibition.

Although the present invention is useful in many chemical conversions and catalyst regenerations, these apparatus and methods find particular applicability in systems for the catalytic cracking of hydrocarbons and the regeneration of catalysts so employed. Such catalytic hydrocarbon cracking often involves converting, i.e., cracking, heavier or higher boiling hydrocarbons to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range from about 400° to about 1000° F. Other substantially hydrocarbon feedstocks, e.g., other high boiling or heavy fractions of petroleum, shale oil, tar sand oil, coal and the like, may be cracked using the apparatus and method of the present invention. Such substantially hydrocarbon feedstock often contain minor amounts of contaminants, e.g., sulfur, nitrogen and the like.

Hydrocarbon cracking conditions are well known and often include temperatures from about 850° to about 1100° F., preferably from about 900° to about 1050° F. Other reaction conditions usually include pressures of up to about 100 psig.; catalyst to oil ratios of from about 5 to 1 to about 25 to 1; and weight hourly space velocities of from about 3 to about 60. These hydrocarbon cracking conditions are not critical to the present invention and may be varied depending, for example, on the feedstock and catalyst being used and the product wanted. The hydrocarbon cracking reaction is generally conducted in the essential absence of added free molecular hydrogen.

In addition, the catalytic hydrocarbon cracking system includes an apparatus for restoring the catalytic activity of catalyst particles previously used to promote hydrocarbon cracking. This apparatus involves a catalyst regeneration zone into which at least a portion of the catalyst from the cracking reaction zone is withdrawn. Such catalyst is contacted with free oxygen-containing gas in the regeneration zone to restore or maintain the activity of the catalyst by removing, i.e., combusting, carbonaceous material deposited on the catalyst particles. The combustion gas temperature in the regeneration zone is generally from about 900° to about 1500° F., preferably from about 900° to about 1300° F. and more preferably from about 1100° to about 1300° F. At least a portion of the regenerated catalyst is often returned to the hydrocarbon cracking reaction zone.

The catalyst particles useful in the catalytic hydrocarbon cracking embodiment of the present invention may be any conventional catalyst capable of promoting hydrocarbon cracking at the conditions present in the reaction zone, i.e. hydrocarbon cracking conditions. Similarly, the catalytic activity of such particles is restored at the conditions present in the regeneration zone. Typical among these conventional catalysts are those which comprise alumina, silica, silica-alumina, at least one crystalline alumino silicate having pore diameters of from about 8 to about 15A and mixtures thereof. Because of the increased economic incentive for maintaining the particle size of zeolite-containing catalyst, it is preferred that the catalyst particles comprise from about 1 to about 50%, more preferably from about 5 to about 22%, by weight of at least one crystalline alumino-silicate having a pore diameter of from about 8 to about 15A. At least a portion of the alumina, silica, silica-alumina and crystalline alumino-silicate may be replaced by clays which are conventionally used in hydrocarbon cracking catalyst compositions. Typical examples of these clays include halloysite or dehydrated halloysite (kaolinite), montmorillonite, bentonite and mixtures thereof. These catalyst compositions may also contain minor amounts of other inorganic oxides such as magnesia, zirconia, etc. When the catalyst particles contain crystalline alumino-silicate, the compositions may also include minor amounts of conventional metal promotors such as the rare earth metals, in particular, cerium. Such catalyst compositions are commercially available in the form of relatively small particles, e.g., having diameters in the range from about 20 to about 200 microns, preferably from about 20 to about 150 microns. In general, and except as otherwise provided for herein, the apparatus of the present invention may be fabricated from any suitable material or combination of materials of construction. The material or materials of construction used for each component of the present apparatus may be dependent upon the particular application involved. Of course, the apparatus should be made of materials which are substantially unaffected, except for normal wear and tear, by the conditions at which the apparatus are normally operated. In general, such material or materials should have no substantial detrimental effect on the feedstock being chemically converted, the chemical conversion product or products or the catalyst being employed.

These and other aspects and advantages of the present invention are set forth in the following detailed description and claims, particularly when considered in conjunction with the accompanying drawings in which like parts bear like reference numerals.

In the drawings:

FIG. 2 is a partial side elevation view, partly in section, of one embodiment of the separation means shown in FIG. 1.

FIG. 3 is a section view of the embodiment shown in FIG. 2 taken along line 3—3.

FIG. 4 is a partial side elevation view, partly in section, of another embodiment of the separation means shown in FIG. 1.

FIG. 5 is a top elevation view of the embodiment shown in FIG. 4.

FIG. 6 is a partial side elevation view, partly in section, of a further embodiment of the separation means shown in FIG. 1.

FIG. 7 is a section view of the embodiment shown in FIG. 6 taken along FIG. 7—7.

FIG. 8 is a partial side elevation view, partly in section, of one alternative embodiment of the present improved separation means.

FIG. 9 is a section view of the embodiment shown in FIG. 8 taken along FIG. 9—9.

Figure 1:
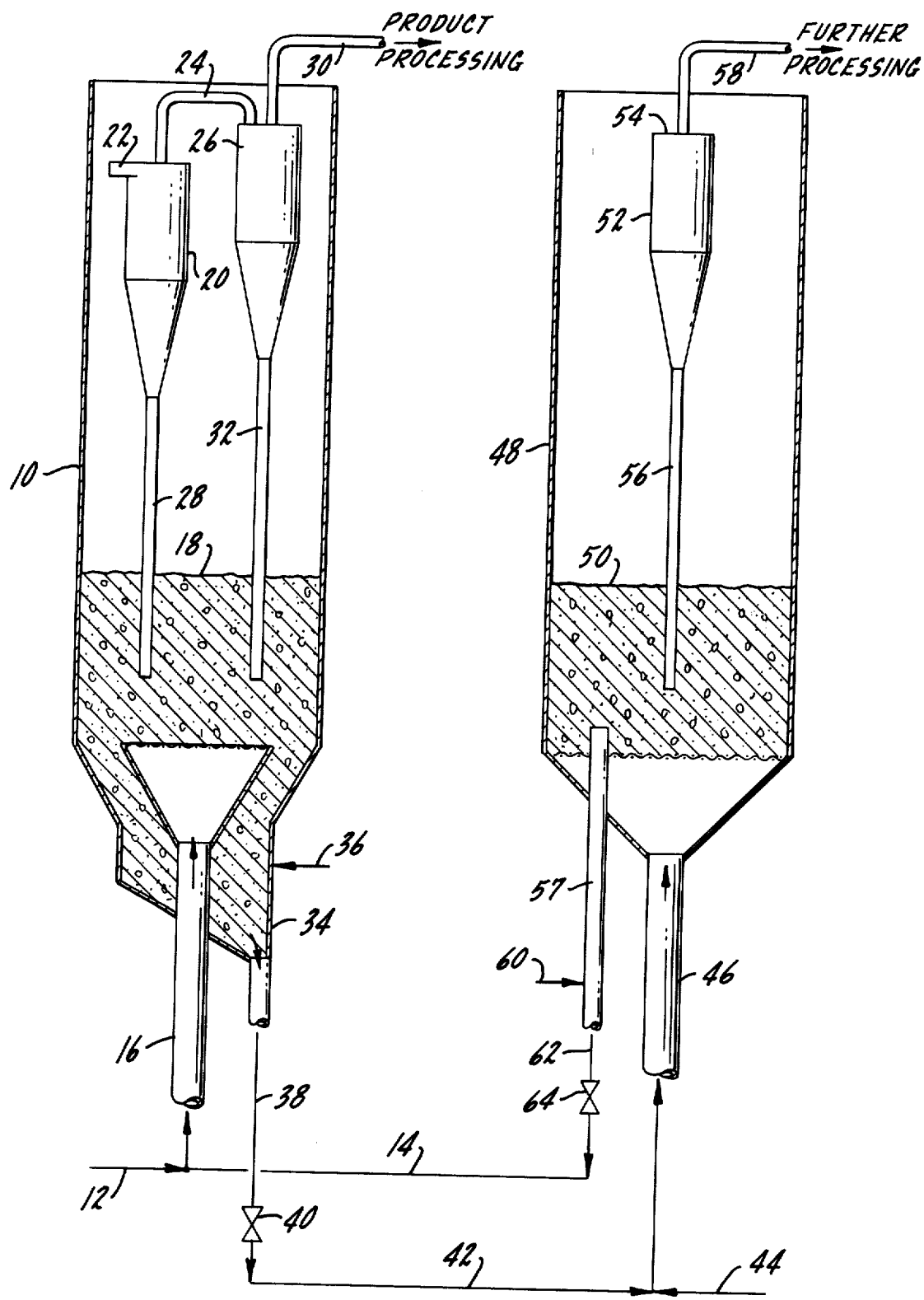
FIG. 1 is a simplified schematic view of a fluid bed catalytic hydrocarbon cracking reactor-regeneration system.

Referring now to the drawings, FIG. 1 shows a simplified schematic diagram of a catalytic hydrocarbon cracking reactor-regenerator system. Although the drawings and following description are directed particularly to catalytic hydrocarbon cracking, the present invention may be readily adapted to apparatus and methods for other chemical conversions and catalyst regenerations by those skilled in the art. In FIG. 1, reactor 10 provides the required space for catalytic hydrocarbon cracking to occur. Preheated hydrocarbon feedstock, e.g., petroleum derived gas oil, from line 12 is combined with catalyst particles, e.g., more than 90% by weight of such particles having diameters in the range from about 30 to about 100 microns, from line 14. The mixture of feedstock and catalyst flows through riser 16 (where a portion of the catalytic hydrocarbon cracking takes place) into reactor 10. The feedstock (and certain cracked products) form a "dense fluid bed" below level 18. The solid particles-vapor, e.g., cracked products and unreacted feedstock, mixture in reactor 10 above level 18 is in the form of a "lean fluid". This "lean fluid" enters first separator 20 tangentially through inlet 22. First separator 20 acts, as will be described in detail hereinafter, to separate a portion of the solid particles in the "lean fluid" from the remainder of the solid catalyst particles-vapor mixture, which is sent through line 24 to second separator 26. The separated solid particles from first separator 20 flow through first dip leg 28 to the "dense fluid bed" below level 18. The solid particles-vapor mixture in line 24 is conveyed to the top of second separator 26 which acts to further separate solid particles from the vapor. Vapor from second separator 26 exits through line 30 and is sent to product processing, e.g., fractionation, other chemical reactions and the like, to produce a final saleable product. The vapor in line 30 may also require additional processing to remove any remaining solid particles, e.g., by conventional means well known in the art. The separated solid particles leave second separator 26 by second dip leg 32 which exits below level 18.

Solid particles are withdrawn from reactor 10 through first stripper 34. Stripping gas, e.g., steam, from line 36 enters first stripper 34 and acts to strip hydrocarbon from the solid particles exiting reactor 10. The stripped solid catalyst particles from first stripper 34 flow through line 38, past valve 40, through line 42 and are combined with an oxygen-containing gas, e.g., air, from line 44. The mixture of solid catalyst particles, which include carbonaceous deposit material formed in reactor 10, and oxygen-containing gas flow through pipe 46 into regenerator 48 where at least a portion of the carbonaceous deposit material on the solid catalyst particles is removed by combustion with the oxygen-containing gas. The "lean fluid" above the level 50 in regenerator 48 is a mixture of solid catalyst particles and vapor. This "lean fluid" enters third separator 52 via top inlet 54. Third separator acts to separate solid catalyst particles, which exit third separator 52 through third dip leg 56, from the vapor which exits the third separator 52 through outlet line 58. The vapor from line 58, which includes combustion flue gases, may be released to the atmosphere or further processed, for example, in an electrostatic precipitator, to remove any remaining solid particles.

Regenerated catalyst solid particles, i.e., catalyst particles which have had catalytic activity at least partially restored by removal of carbonaceous deposit material, are removed from regenerator 50 through standpipe 57. As the solid catalyst particles flow through standpipe 57, fluidizing gas, e.g., steam, from line 60 enters standpipe 57, contacts the solid particles, thereby fluidizing the solid particles in standpipe 57 and acting to strip any remaining oxygen-containing gas from the solid particles. The thus fluidized and stripped solid catalyst particles flow from standpipe 57 through line 62, past valve 64 and into line 14. The solid catalyst particles from line 14 are combined with the hydrocarbon feedstock from line 12 and the cycle is repeated.

Referring now to FIGS. 2 and 3, first separator 20 is shown in more detail. First separator 20 is defined by hollow cylinder 66, which has an interior cylindrical surface 67, cone shaped hopper 68, line 24, dip leg 28 and vanes 70. Inlet 22 is situated to allow substantially tangential entry of the solid particles-vapor mixture into first separator 20. Inlet 22, line 24 and dip leg 28 act as described above. The solid particles-vapor mixture from inlet 22 is caused to flow in a generally spiralling downwardly fashion through a portion of the space defined by the hollow cylinder 66. Such flow results in the solid particles preferentially moving toward the interior cylindrical surface 67. Vanes 70 are attached, e.g., welded, to the interior cylindrical surface 67. Vanes 70 act to slow the solid particles as they preferentially move toward interior cylindrical surface 67, thus reducing the impact force encountered by the solid particles hitting interior cylindrical surface 67.

As shown in FIGS. 2 and 3, each of the vanes 70 runs substantially the entire length of hollow cylinder 66 and are of substantially uniform width. The ends of the vanes 70 away from interior cylindrical surface 67 extend a substantially uniform distance into the space defined by hollow cylinder 66. In other words, each of the vanes 70 is disposed at a substantially uniform angle relative to the hollow cylinder 66. In addition, each of the vanes 70 overlaps at least one other vane 70. Thus, the vanes 70 form corridors, or channels, for the passage of solid particles as they preferentially move toward the interior cylindrical surface 67. As the solid particles approach the interior cylindrical surface 67, gravity acts to force the particles down along the side of interior cylindrical surface 67, into hopper 68 and then into first dip leg 28. Catalyst particles in first dip leg 28 form a vapor seal so that vapor in first separator 20 is substantially prevented from exiting through first dip leg 28. Instead, such vapor is removed from first separator 20 through line 24. This vapor also includes solid particles at least a portion of which are to be removed in the second separator 26.

The second separator 26 is shown in more detail in FIGS. 4 and 5. The mixture of solid catalyst particles and vapor exiting first separator 20 flows through line 24 and enters through the top of second separator 26. Second separator 26 is defined by hollow cylinder 72, which has an interior cylindrical surface 73, conical hopper 74, second dip leg 32, and outlet line 30. Also included are inclined vanes 75 and a single pair of partial baffles 76 and 78. Each of the inclined vanes 75 is attached, e.g., welded, to the interior cylindrical hollow surface 73. Each of the partial baffles 76 and 78 is attached, e.g., welded, to outlet line 30.

The partial baffles 76 and 78 are situated so as to cause the solid particles-vapor mixture entering the top of second separator 26 to flow in a generally spiralling fashion generally downwardly through a portion of the space defined by the hollow cylinder 72. As this solid particles-vapor mixture flows in such a manner in the hollow cylinder 72, at least a portion of the solid particles preferentially move toward the interior cylindrical surface 73. Inclined vanes 75 act to slow the velocity of the solid particles as they preferentially move toward the interior cylindrical surface 73, thus cushioning the impact of these solid particles with the interior cylindrical surface 73 and reducing the amount of break-up or attrition of such solid particles.

Each of the inclined vanes 75 is inclined at a substantially uniform angle, with respect to the central axis of hollow cylinder 72, in the general direction of the spiralling downwardly flow of the solid particles-vapor mixture in the proximity of the inclined vanes 75. Such inclination of vanes 75 has been found to reduce the resistance to flow of the solid particles-vapor mixtures through hollow cylinder 72, to provide improved separation of the solid catalyst particles and the vapor, and to result in still further reduction in the attrition of the solid catalyst particles. As indicated in FIG. 4, inclined vanes 75 are present in several rows. Such configuration is useful because of ease of fabrication. However, such configuration is not an essential feature of the present invention. Thus, in this embodiment, any placement of the inclined vanes 75 is suitable and within the scope of the invention, provided that such inclined vanes 75 are inclined in the general direction of spiralling downwardly flow of the solid particles-vapor mixture in the proximity of the inclined vanes 75, and further provided that such inclined vanes 75 act to reduce the velocity of the solid particles moving preferentially toward the interior cylindrical surface 73.

Second separator 26 functions as follows. The mixture of solid particles and vapor enters hollow cylinder 72 from line 24. As this mixture flows past the pair of partial baffles 76 and 78, the solid particles and vapor are caused to flow in a generally spiralling fashion generally downwardly through a portion of the space defined by hollow cylinder 72. At least a portion of the solid particles in the mixture are caused to preferentially move toward the interior cylindrical surface 73 of hollow cylinder 72. As solid particles approach interior cylindrical surface 73, gravity causes these particles to fall into conical hopper 74 and then into second dip leg 32. The solid particles in second dip leg 32 act as a vapor seal so that the vapor in hollow cylinder 72 is caused to exit through outlet line 30. In this fashion, the solid particles-vapor mixture entering hollow cylinder 72 is at least partially separated.

Third separator 52 is shown in more detail in FIGS. 6 and 7. Third separator 52 is defined by hollow cylinder 80, having an interior cylindrical surface 81, top inlet 54, hopper 82, third dip leg 56 and outlet line 58. Third separator 52 also includes two pair of partial baffles 84 and 86 as well as 88 and 90. Each of these baffles is attached, e.g., welded, to outlet line 58. Partial plate 92 is attached, e.g., welded, to the interior cylindrical surface 81 of hollow cylinder 80. Outlet 91 provides an intermediate outlet from hollow cylinder 80 and is in fluid communication with third dip leg 56 through pipe 94. Third separator 52 also includes several rows of inclined vanes 96 each of which is attached, e.g., welded, to the interior cylindrical surface 81 of hollow cylinder 80.

Third separator 52 functions as follows. The solid particles-vapor mixture from regenerator 48 enters the interior of hollow cylinder 80 through top inlet 54. As this mixture passes partial baffles 84 and 86, the mixture of solid particles and vapor is caused to flow in a generally spiralling fashion generally downwardly through a portion of the space defined by hollow cylinder 80. Such movement causes at least a portion of the solid particles to preferentially move toward the interior cylindrical surface 81 of hollow cylinder 80. Inclined vanes 96 act to reduce the velocity of these solid particles as they approach the interior cylindrical surface 81 of hollow cylinder 80. As solid particles approach interior cylindrical surface 81, gravity causes such particles to fall onto partial plate 92. The spiralling motion of the vapor passing partial plate 92 causes at least a portion of the solid particles on partial plate 92 to fall through pipe 94. The solid particles in pipe 94 are conveyed to third dip leg 56. The remaining solid particles and vapor from a mixture which flows past partial baffles 88 and 90. Partial baffles 88 and 90 are inclined at a less severe angle (relative to the horizontal) than are partial baffles 84 and 86. Thus, partial baffles 88 and 89 act to increase the radial component of the velocity of the solid particles-vapor mixture. Such increase in the radial velocity increases the force acting upon the solid particles to move such particles toward the interior cylindrical surface 81 of hollow cylinder 80. Again, as these particles approach interior cylindrical surface 81 of hollow cylinder 80, gravity acts to force such solid particles down toward hopper 82 and into third dip leg 56. The solid particles in third dip leg 56 provide a vapor seal so that the vapor in hollow cylinder 80 is forced through outlet line 58.

The embodiment of the present invention illustrated by third separator 52 provides for intermediate removal of solid catalyst particles through pipe 94 prior to increasing the radial velocity of the remaining solid particles-gas mixture. Since these solid particles which are removed through pipe 94 are not subjected to increased radial velocities, attrition of such solid catalyst particles is reduced. Only after these particles are removed from hollow cylinder 80 through pipe 94 is the radial velocity of the remaining solid particles-gas mixture increased by flowing past partial baffles 88 and 90. Increasing the radial velocity of this remaining mixture acts to improve the degree of separation between the solid particles and vapor by the apparatus of this embodiment of the present invention. Thus, the present invention provides reduced solid particle attrition and increased separation efficiency.

The intermediate removal of solid particles from hollow cylinder 80 through pipe 94 plus the increased radial velocity caused by partial baffles 88 and 90 allows the third separator 52 to have a separating capacity approaching that of two separators in series, e.g., such as first separator 20 and second separator 26. Thus, an apparatus similar to third separator 52 may be used in reactor 10 in place of, or in conjunction with, first separator 20 and second separator 26. For example, if additional separation is desired in reactor 10, an apparatus similar to third separator 52 may be used in series with first separator 20 to replace second separator 26. Of course, apparatus similar to first separator 20 and/or second separator 26 may be used in series with or as a replacement for third separator 52 to separate the solid catalyst particles-vapor mixture from regenerator 48. Other combinations of apparatus similar to first, second and third separators 20, 26, and 52 may also be used in either reactor 10 and regeneratore 48 and all such combinations are within the scope of the present invention. In addition, first separator 20 may include a top inlet (rather than the tangential inlet 22 shown) and also include at least one pair of partial baffles, such as partial baffles 76 and 78, to cause the solid particles-vapor mixture to flow in a generally spiralling fashion generally downwardly through a portion of the space defined by hollow cylinder 66. Other modifications regarding position of various components of the present apparatus are also within the scope of the present invention.

Although FIG. 1 illustrates a single series of separators, i.e., first and second separators 20 and 26 in series, and a single separator, i.e., third separator 52, conventional reaction zones and regeneration zones often include a plurality of separators or series of separators. For example, reactor 10 and/or regenerator 48 may contain from about four to about 12 parallel series of separators with from one to about three separators in each series. Each of the individual separators in each of these series may be constructed similarily to first, second or third separators 20, 26, or 52. In any event, apparatus and methods involving such plurality of separators or series of separators are within the scope of the present invention.

One additional embodiment of the present invention is shown in detail in FIGS. 8 and 9. The separator, referenced generally as 100, is defined by hollow cylinder 102, having an interior cylindrical surface 103, hopper 104, dip leg 106 and vapor outlet line 108. Also included in separator 100 are four corner pieces 110 which provide fluid communication between the reactor 10 (or regenerator 48) and the interior of hollow cylinder 102. Corner pieces 110, which are each attached, e.g., welded, to the outside of hollow cylinder 102, are each in fluid communication with dip leg 106 through pipes 112. Each of the corner pieces 110 acts to cause the mixture of solid catalyst particles and vapor to reverse its direction of flow prior to entering the interior of hollow cylinder 102. Such flow reversal causes a portion of the solid particles to be separated from the mixture prior to entering the interior of hollow cylinder 102. The solid particles which are separated in corner pieces 110 suffer reduced attrition since, for example, such particles are separated at conditions providing reduced attrition and are not subjected to the conditions exiting within hollow cylinder 102.

Separator 100 functions as follows. The solid particles-vapor mixture from reactor 10 (or regenerator 48) enters the four corner pieces 110, as shown in FIG. 9. As this mixture passes through the corner pieces 110, the flow of the mixture is reversed, thus causing a portion of the solid catalyst particles to be separated. The separated solid catalyst particles fall through pipes 112 into dip leg 106. The remaining solid particles-vapor mixture enters the interior of hollow cylinder 102. Because of the tangential entry of this mixture into the interior of hollow cylinder 102, the mixture flows in a generally spiralling fashion generally downwardly through a portion of the space defined by the hollow cylinder 102. Such movement of the mixture causes solid particles to preferentially move toward the interior cylindrical surface 103 of hollow cylinder 102. As these solid particles approach the interior cylindrical surface 103, gravity acts to force such particles down through hopper 104 into dip leg 106. The solid particles enter dip leg 106 and act to form a vapor seal. The vapor in hollow cylinder 102 exits through outlet line 108. In this manner, the solid particles-vapor mixture entering separator 100 is separated.

Although not an essential component of the embodiment of the present invention illustrated in FIGS. 8 and 9, separator 100 may, and preferably does, include arresting means, e.g., such as vanes 70 or inclined vanes 75. Also, separator 100 may include one or more pairs of partial baffles such as partial baffles 76 and 78, to alter the radial velocity of the solid particles-vapor mixture in hollow cylinder 102.

Separator 100 may be used in conjunction with, or as a replacement for, first separator 20, second separator 26 or third separator 52. In any event, the apparatus illustrated by separator 100 and its use have been found to provide outstanding reduction in solid catalyst particle attrition.

The following examples clearly illustrate the present invention. However, these examples are not to be interpreted as specific limitations on the invention.

EXAMPLES 1 to 4

These examples illustrate certain of the advantages of the present invention.

A device which propels a mixture of solid catalyst particles and air was used to simulate the movement of solid catalyst particles in various separators.

This device involves a cylindrical chamber having an inside diameter of 17 inches and a depth of 3 inches. Centrally mounted in the chamber is an impeller having four blades or paddles. The impeller has an overall diameter of 10 inches and a depth of 1.375 inches. The impeller is driven by a variable speed motor which is mounted above and outside the chamber. A series of eight baffles surround the impeller. Each of these baffles is 3 inches deep, 6 inches long and is welded to the interior peripheral surface of the chamber. Each of the baffles extend from this surface a substantially uniform radial distance of 3 inches into the chamber. Also, each of the baffles is situated at a substantially uniform acute angle relative to the tangent at the point of attachment to the chamber.

A conical hopper, situated directly below the chamber, is in fluid communication with the chamber. A plate situated directly below and substantially co-extensive with the diameter of the impeller prevents catalyst particles from falling into the hopper before the particles are forced out radially beyond the impeller. A piece of flexible 1 inch O.D. tubing provides fluid communication between the bottom of the hopper and the chamber. This tubing enters the chamber from below and terminates in the space at the center of the impeller.

This device functions as follows. A quantity of catalyst particles, of known size distribution, is stored in the hopper. Air, from the surrounding environment is allowed to mix with the particles. The variable speed motor is activated and causes the impeller to rotate. Such rotation creates forces causing the catalyst particles-air mixture to flow through the tubing into the chamber. The impeller forces the mixture in the chamber toward the peripheral interior surface of the chamber. At least a portion of the solid particles strikes this surface. In any event, substantially all of the solid particles are returned to the hopper from the chamber and are recycled to the chamber through the tubing. After a period of time of operation, the solid catalyst particles in the hopper are analyzed for size to determine the degree of particle attrition which resulted from operation of the device.

In addition, a smooth cylindrical insert can be placed in the chamber. The perimeter of this insert is defined by the edges of the baffles away from the interior peripheral surface of the chamber. The insert has substantially the same depth as the baffles. Operation of the device with this insert in place simulated the operation of a separator without arresting means, e.g., baffles, vanes and the like.

Velocities and mass circulation rates within the test device are determined as follows:

The rotations per minute (rpm) of the variable speed motor is accurately measured by a strobe tachometer, which permits the calculation of the tangential component of velocity of the mixture of catalyst particles and air leaving the impeller. The impeller is supported by the variable speed motor, and contacted the chamber housing only through a felt washer of negligible friction. The chamber housing is supported from a ball bearing, so that the torque caused by the circulation of air and catalyst particles can be measured. A string, having a weight M suspended therefrom, is attached to the chamber housing tangential to the outer perimeter of the impeller. Force is calculated from the lateral displacement of the suspended weight using the following equation:

$$\text{Force} = M \frac{X}{\sqrt{L^2 - X^2}}$$

wherein:
$X$ = the lateral displacement of the weight from the chamber housing
$L$ = the length of the string With the variable speed motor in operation, the air circulation is blocked off by closing the tubing with pinch clamps, and the force caused by friction and internal turbulence is measured. Then, the pinch clamps are removed, and the increase in force caused by circulating air is noted. Then, the catalyst is added and the incremental force caused by catalyst circulation is measured. Circulation rates of both air and catalyst are calculated from tangential force and tangential velocity as follows:

$$\text{Force (in grams)} = \frac{\text{Catalyst Circulation Rate (in grams per second)} \times \text{Total Catalyst Velocity (in centimeters per sec)}}{980}$$

A catalyst particle undergoing radial acceleration by a rotating blade describes a logarithmic spiral, and will leave a rotating blade of the impeller at an angle of 45° to the tangent so that its radial and tangential velocities are equal, if it begins near the center and if there is no frictional drag against the blade. In this case, the coefficient of friction of the catalyst particles is known from the angle of repose of a mass of such particles, so this can be used in the calculation of radial velocity. Tangential velocity of the catalyst particles is calculated as follows:

$V_t = 2\pi rw$; where $r$ is the radius of the vane and $w$ is revolutions per unit time of the impeller. If the catalyst particles are introduced close to the center of the impeller, the radial velocity of the catalyst particles is:

$$V_r = (\sqrt{4 + a^2} - a)\pi rw;$$

where $a$ is the coefficient of friction of the catalyst. The total velocity of the catalyst particles will be the vector sum of the tangential and radial velocities:

$$V = \sqrt{V_t^2 + V_r^2}$$

Using a value of 0.45 for $a$, the net velocity is 1.26 times the tangential velocity.

The catalyst particles used in this test device were obtained from a commercial fluid bed catalytic hydrocarbon cracking reaction system. These particles had a composition which included about 15% by weight of alumino-silicate in a binder comprising silica-alumina. Before operation of the test device, these solid particles had the following size distribution:

| Size, Microns | % By Weight |
|---|---|
| 120+ | 12.0 |
| 100–120 | 18.0 |
| 80–100 | 24.0 |
| 60–80 | 23.0 |
| 40–60 | 5.6 |
| 0–20 | 1.5 |

Approximately 20 grams of these catalyst particles were placed in the hopper of the test device prior to each test.

A series of four tests were run with the second of the motor set at 2300 rpm. In three of these tests, the baffles remained uncovered, while in one test the smooth insert covered the baffles, as described above. Results of these tests were as follows:

| RUN | Configuration | Total Velocity, Ft./Sec. | Catalyst Circulation, gms./sec. | Total Catalyst Circulated gms. | Incremental fines Production gms.* |
|---|---|---|---|---|---|
| 1 | Baffles Uncovered | 127 | 9.2 | 8280 | 0.13 |
| 2 | " | 127 | 12.8 | 11540 | 0.164 |
| 3 | " | 127 | 6.5 | 7790 | 0.15 |
| 4 | Smooth Insert In place | 127 | 8.8 | 7940 | 0.88 |

*Incremental Fines Production is defined as the net increase in particles 20 microns or less in size which is apparent in the mass of catalyst after each test.

These results indicate clearly that the separation means included in the present apparatus provides unexpected and substantial benefits. For example, when the test device described above was configured to simulate the separation means of the present apparatus, i.e., runs 1, 2, and 3, incremental fines production was less than 20% the fines production with the device configured to simulate a smooth wall cyclone separator, i.e., run 4. Thus, the present apparatus and methods which involve separation means including arresting means surprisingly provide reduced catalyst particle attrition, e.g., relative to conventional separators.

EXAMPLE 5

A catalytic cracking system, configured as shown in FIG. 1, is employed to convert 20,000 barrels per day of fresh petroleum derived gas oil to lower boiling hydrocarbons. The catalyst employed in the system is a commercially available composition which included about 15% by weight of an aluminosilicate in a binder comprising silicaalumina. This catalyst has a particle size distribution similar to the catalyst particles used in Examples 1 to 4.

The weight ratio of catalyst particles to total (fresh plus recycle) hydrocarbon feed entering riser 16 is about 8 to 1. conditions within reactor 10 are as follows:

| Temperature, ° F. | 930 |
|---|---|
| Pressure, psig | 8 |
| WHSV | 15 |

Such conditions result in about 75% by volume conversion of the gas oil feedstock to products boiling at 400° F. and below. A mixture of solid catalyst particles and hydrocarbon vapor enter each of six series of separators similar to first separator 20 and second separator 26, which are employed in series as shown in FIG. 1. Such separators act to separate solid catalyst particles from the hydrocarbon vapor, which is passed to product processing. Such processing also provides a stream of unreacted hydrocarbons, a portion of which is recycled and combined with fresh feedstock, and heated prior to entering riser 16 for further cracking.

Catalyst particles from reactor 10 flow through stripper 34 into lines 38 and 42 and are combined with the air stream from line 44. These catalyst particles from reactor 10 have carbonaceous deposits thereon. Such catalyst particles include about 1.5% by weight of coke which is to be at least partially combusted in regenerator 48.

Air in line 44 is heated so that the desired temperature within regenerator 48 is maintained. The amount of air added to regenerator 48 includes about 1.15 times the amount of oxygen theoretically required to completely combust the coke from the catalyst particles. Conditions existing within the regenerator 48 and at which combustion of the carbonaceous catalyst deposits take place are as follows:

| Temperature, ° F. | 1150 |
|---|---|
| Pressure, psig. | 8 |
| Average Catalyst Residence Time, Min. | 12 |

A mixture of solid catalyst particles and a gaseous phase, e.g., uncombusted oxygen, combustion products, nitrogen, steam and the like, enter each of six separators similar to third separator 52 where such mixture is at least partially separated.

Catalyst particles from regenerator 48 enter standpipe 57 and flow through lines 62 and 14 and are combined with hydrocarbon feedstock from line 12 prior to entry into riser 16.

After a period of time in operation, it is determined that this system provides improved results, e.g., reduced catalyst particle attrition, relative to a similar reactor-regenerator system involving conventional cyclone separators in place of the separators similar to first separator 20, second separator 26 and third separator 52 of the system described above.

EXAMPLE 6

Improved results, e.g., reduced catalyst particle attrition relative to a system with conventional cyclone separators, are obtained using various modifications of the reactor-regenerator system shown in FIG. 1 to process 20,000 barrels per day of a fresh petroleum derived gas oil. The modifications which are used include (1) replacing one or both of the first and second separators 20 and 26 in reactor 10 with a device similar to third separator 52 and/or a device similar to the separator depicted in FIGS. 8 and 9. Another useful modification involves replacing the third separator 52 in regenerator 48 with a device similar to first separator 20 and/or second separator 26 and/or the separator depicted in FIGS. 8 and 9. In any event, outstanding benefits, e.g., reduced catalyst particle attrition, are achieved while using such modified systems.

While this invention has been described with respect to various specific examples and embodiments, it is to be understood that the invention is not limited thereto and that it can be variously practiced within the scope of the following claims.

The embodiments of the invention in which an exclusive property or privilege is claimed and defined as follows:

1. In an apparatus for carrying out chemical conversion of a feedstock which includes a chemical reaction zone wherein said feedstock is contacted with solid particles capable of promoting said chemical conversion at chemical conversion conditions to form at least one chemical conversion product and a mixture of solid particles and vapor, the major portion by weight of said solid particles having diameters in the range from about 10 to about 500 microns; and at lease one separation means in fluid communication with said reaction zone wherein said mixture is at least partially separated, said separation means comprising a chamber defined by an interior cylindrical surface; an inlet means in fluid communication with both said reaction zone and said chamber to allow entry of said mixture to said chamber, said inlet means being situated so that the movement of said mixture in said chamber causes solid particles to preferentially move toward said cylindrical surface; a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises:

arresting means located in spaced relation to said interior cylindrical surface to slow the velocity of at least a portion of said solid particles as said solid particles preferentially move toward said cylindrical surface, thereby inhibiting the attrition of said solid particles.

2. The apparatus of claim 1 wherein said arresting means comprises a plurality of vanes attached to said cylindrical surface and which extend inwardly toward the central axis of said chamber.

3. The apparatus of claim 2 wherein said vanes which are mutually adjacent form a channel into which flows at least a portion of said solid particles preferentially moving toward said cylindrical surface.

4. The apparatus of claim 3 wherein said vanes are attached to said cylindrical surface and are positioned so that each said vane overlaps at least one adjacent vane when viewed from the central axis of said chamber.

5. The apparatus of claim 4 wherein each of said vanes is inclined at an angle relative to said central axis of said chamber to reduce the resistance to flow of said solid particles and vapor in said chamber caused by said vanes.

6. The apparatus of claim 5 wherein each of said vanes extend a substantially equal distance into said chamber so that the end of said vanes away from said cylindrical surface is at a substantially equal distance from said central axis of said chamber and each of said vanes is inclined at a substantially uniform angle relative to said central axis of said chamber.

7. The apparatus of claim 1 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

8. The apparatus of claim 2 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

9. The apparatus of claim 4 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

10. The apparatus of claim 6 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

11. The apparatus of claim 1 wherein said inlet means includes at least one flow directing means located in spaced relation to said interior cylindrical surface acting to direct the flow of said mixture in said chamber so that at least a portion of said solid particles move preferentially toward said cylindrical surface.

12. The apparatus of claim 2 wherein said inlet means includes at least one flow directing means located in spaced relation to said interior cylindrical surface acting to direct the flow of said mixture in said chamber so that at least a portion of said solid particles move preferentially toward said cylindrical surface.

13. The apparatus of claim 4 wherein said inlet means includes at least one flow directing means located in spaced relation to said interior cylindrical surface acting to direct the flow of said mixture in said chamber so that at least a portion of said solid particles move preferentially toward said cylindrical surface.

14. The apparatus of claim 6 wherein said inlet means includes at least one flow directing means located in spaced relation to said interior cylindrical surface acting to direct the flow of said mixture in said chamber so that at least a portion of said solid particles move preferentially toward said cylindrical surface.

15. The apparatus of claim 1 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

16. The apparatus of claim 2 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

17. The apparatus of claim 4 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

18. The apparatus of claim 6 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

19. The apparatus of claim 1 wherein said separation means further comprises at least one velocity altering means located in spaced relation to said interior cylindrical surface downstream from said inlet means to change the radial component of the velocity of the mixture of solid particles and vapor flowing past said velocity altering means.

20. The apparatus of claim 2 wherein said separation means further comprises at least one velocity altering means located in spaced relation to said interior cylindrical surface downstream from said inlet means to change the radial component of the velocity of the mixture of solid particles and vapor flowing past said velocity altering means.

21. The apparatus of claim 4 wherein said separation means further comprises at least one velocity altering means located in spaced relation to said interior cylindrical surface downstream from said inlet means to change the radial component of the velocity of the mixture of solid particles and vapor flowing past said velocity altering means.

22. The apparatus of claim 6 wherein said separation means further comprises at least one velocity altering means located in spaced relation to said interior cylindrical surface downstream from said inlet means to change the radial component of the velocity of the mixture of solid particles and vapor flowing past said velocity altering means.

23. The apparatus of claim 19 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

24. The apparatus of claim 20 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

25. The apparatus of claim 21 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

26. The apparatus of claim 22 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

27. In an apparatus for carrying out chemical conversion of a feedstock which includes a chemical reaction zone wherein said feedstock is contacted with solid particles capable of promoting said chemical conversion at chemical conversion conditions to form at least one chemical conversion product and a mixture of solid particles and vapor, the major portion by weight of said solid particles having diameters in the range from about 10 to about 500 microns; and at least one separation means in fluid communication with said reaction zone wherein said mixture is at least partially separated, said separation means comprising a chamber defined by an interior cylindrical surface; an inlet means in fluid communication with both sad reaction zone and said chamber to allow entry of said mixture to said chamber, said inlet means being situated so that movement of said mixture in said chamber causes solid particles to preferentially move toward said cylindrical surface; a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises:
at least one flow reversal means as a component of said inlet means to substantially reverse the direction of flow of said mixture prior to said mixture entering said chamber to thereby cause at least a portion of said solid particles to be separated from said mixture prior to said mixture entering said chamber, thereby inhibiting the attrition of said solid particles.

28. The apparatus of claim 27 wherein said apparatus further comprising at least one particle withdrawal means in fluid communication with said flow reversal means for transporting said solid particles separated in said flow reversal means from said separation means.

29. The apparatus of claim 28 wherein said particle withdrawal means is fluid communication with said particle outlet means.

30. In an apparatus for carrying out chemical conversion of a feedstock which includes a chemical reaction zone wherein said feedstock is contacted with solid particles capable of promoting said chemical conversion at chemical conversion conditions to form at least one chemical conversion product and a mixture of solid particles and vapor, the major portion by weight of said solid particles having diameters in the range from about 10 to about 500 microns; and at least one separation means in fluid communication with said reaction zone wherein said mixture is at least partially separated, said separation means comprising a chamber defined by an interior cylindrical surface; an inlet means in fluid communication with both said reaction zone and said chamber to allow entry of said mixture to said chamber, said inlet means being situated so that the movement of said mixture in said chamber causes solid particles to preferentially move toward said cylindrical surface; a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises:
at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

31. The apparatus of claim 30 wherein said plate means is attached to said cylindrical surface and said transport means is in fluid communication with said particle outlet means.

32. The apparatus of claim 30 wherein said separation means further comprises at least one velocity altering means located in spaced relation to said interior cylindrical surface downstream from said plate means to change the radial component of the velocity of said mixture of solid particles and vapor flowing past said velocity altering means.

33. In an apparatus for restoring the catalytic activity of solid particles which have previously been used to promote chemical conversion and have deactivating carbonaceous deposit material thereon, the major portion by weight of said solid particles having diameters in the range from about 10 to about 500 microns which includes a regeneration zone wherein said deposit-containing solid particles are contacted with oxygen-containing vapor at conditions to combust at least a portion of said deposit material and form a mixture of solid particles and vapor, and at least one separation means in fluid communication with said regeneration zone wherein said mixture is at least partially separated, said separation means comprising a chamber defined by an interior cylindrical surface; an inlet means to said chamber in fluid communication with both said regeneration zone and said chamber to allow entry of said mixture to said chamber, said inlet means being situated so that the movement of said mixture in said chamber causes solid particles to preferentially move toward said cylindrical surface, a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises:

arresting means located in spaced relation to said interior cylindrical surface to slow the velocity of at least a portion of said solid particles as said particles preferentially move toward said cylindrical surface, thereby inhibiting the attrition of said solid particles.

34. The apparatus of claim 33 wherein said arresting means comprises a plurality of vanes attached to said cylindrical surface and which extend inwardly toward the central axis of said chamber.

35. The apparatus of claim 34 wherein said vanes which are mutually adjacent form a channel into which flows at least a portion of said solid particles preferentially moving toward said cylindrical surface.

36. The apparatus of claim 35 wherein said vanes are attached to said cylindrical surface and are positioned so that each said vane overlaps at least one adjacent vane when viewed from the central axis of said chamber.

37. The apparatus of claim 36 wherein each of said vanes is inclined at an angle relative to said central axis of said chamber to reduce the resistance to flow of said solid particles and vapor in chamber caused by said vanes.

38. The apparatus of claim 37 wherein each of said vanes extends a substantially equal distance into said chamber so that the end of each of said vanes away from said cylindrical surface is at a substantially equal distance from said central axis of said chamber and each of said vanes is inclined at a substantially uniform angle relative to said central axis of said chamber.

39. The apparatus of claim 33 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

40. The apparatus of claim 34 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

41. The apparatus of claim 36 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

42. The apparatus of claim 33 wherein said inlet means includes at least one flow directing means located in spaced relation to said interior cylindrical surface acting to direct the flow of said mixture in said chamber so that at least a portion of said solid particles move preferentially toward said cylindrical surface.

43. The apparatus of claim 34 wherein said inlet means includes at least one flow directing means located in spaced relation to said interior cylindrical surface acting to direct the flow of said mixture in said chamber so that at least a portion of said solid particles move preferentially toward said cylindrical surface.

44. The apparatus of claim 36 wherein said inlet means includes at least one flow directing means located in spaced relation to said interior cylindrical surface acting to direct the flow of said mixture in said chamber so that at least a portion of said solid particles move preferentially toward said cylindrical surface.

45. The apparatus of claim 33 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

46. The apparatus of claim 34 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

47. The apparatus of claim 36 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

48. The apparatus of claim 33 wherein said separation means further comprises at least one velocity altering means located in spaced relation to said interior cylindrical surface downstream from said inlet means to change the radial component of the velocity of the mixture of solid particles and vapor flowing past said velocity altering means.

49. The apparatus of claim 34 wherein said separation means further comprises at least one velocity altering means located in spaced relation to said interior cylindrical surface downstream from said inlet means to change the radial component of the velocity of the mixture of solid particles and vapor flowing past said velocity altering means.

50. The apparatus of claim 36 wherein said separation means further comprises at least one velocity altering means located in spaced relation to said interior cylindrical surface downstream from said inlet means to change the radial component of the velocity of the mixture of solid particles and vapor flowing past said velocity altering means.

51. The apparatus of claim 48 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

52. The apparatus of claim 49 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

53. The apparatus of claim 50 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

54. In an apparatus for restoring the catalytic activity of solid particles which have previously been used to promote chemical conversion and have deactivating carbonaceous deposit material thereon, the major portion by weight of said solid particles having diameters in the range from about 10 to about 500 microns which includes a regeneration zone wherein said deposit-containing solid particles are contacted with oxygen-containing vapor at conditions to combust at least a portion of said deposit material and form a mixture of solid particles and vapor, and at least one separation means in fluid communication with said regeneration zone wherein said mixture is at least partially separated, said separation means comprising a chamber defined by an interior cylindrical surface; an inlet means to said chamber in fluid communication with both said regeneration zone and said chamber to allow entry of said mixture to said chamber, said inlet means being situated so that the movement of said mixture in said chamber causes solid particles to preferentially move toward said cylindrical surface; a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises:

at least one flow reversal means as a component of said inlet means to substantially reverse the direction of flow of said mixture prior to said mixture entering said chamber to thereby cause at least a portion of said solid particles to be separated from said mixture prior to said mixture entering said chamber, thereby inhibiting the attrition of said solid particles.

55. The apparatus of claim 54 wherein said apparatus further comprising at least one particle withdrawal means in fluid communication with said flow reversal means for transporting said solid particles separated in said flow reversal means from said separation means.

56. The apparatus of claim 55 wherein said particle withdrawal means is in fluid communication with said particle outlet means.

57. In an apparatus for restoring the catalytic activity of solid particles which have previously been used to promote chemical conversion and have deactivating carbonaceous deposit material thereon, the major portion by weight of said solid particles having diameters in the range from about 10 to about 500 microns which includes a regeneration zone wherein said deposit-containing solid particles are contacted with oxygen-containing vapor at conditions to combust at least a portion of said deposit material and form a mixture of solid particles and vapor, and at least one separation means in fluid communication with said regeneration zone wherein said mixture is at least partially separated, said separation means comprising a chamber defined by an interior cylindrical surface; an inlet means to said chamber in fluid communication with both said regeneration zone and said chamber to allow entry of said mixture to said chamber, said inlet means being situated so that the movement of said mixture in said chamber causes solid particles to preferentially move toward said cylindrical surface; a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises:

at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

58. The apparatus of claim 57 wherein said plate means is attached to said cylindrical surface and said transport means is in fluid communication with said particle outlet means.

59. The apparatus of claim 57 wherein said separation means further comprises at least one velocity altering means located in spaced relation to said interior cylindrical surface downstream from said plate means to change the radial component of the velocity of said mixture of solid particles and vapor flowing past said velocity altering means.

60. In an apparatus for at least partially separating a mixture of solid particles and vapor including a chamber defined by an interior cylindrical surface; an inlet means in fluid communication with said chamber to allow entry of said mixture to said chamber, said inlet means being situated so that the movement of said mixture in said chamber causes solid particles to preferentially move toward said cylindrical surface; a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises a plurality of vanes attached to said interior cylindrical surface to slow the velocity of at least a portion of said solid particles as said solid particles preferentially move toward said cylindrical surface, thereby inhibiting the attrition of said solid particles, said vanes being positioned so that each said vane overlaps at least one adjacent vane when viewed from the central axis of said chamber.

61. The apparatus of claim 60 wherein each of said vanes extends a substantially equal distance into said chamber so that the end of each of said vanes away from said cylindrical surface is at a substantially equal distance from said central axis of such chamber.

62. The apparatus of claim 60 wherein each of said vanes is inclined at an angle relative to said central axis of said chamber to reduce the resistance to flow of said solid particles and vapor in said chamber caused by said vanes.

63. The apparatus of claim 61 wherein each of said vanes is inclined at an angle relative to said central axis of said chamber to reduce the resistance to flow of said solid particles and vapor in said chamber caused by said vanes.

64. The apparatus of claim 60 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

65. The apparatus of claim 63 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

66. The apparatus of claim 60 wherein said inlet means includes at least one flow directing means located in spaced relation to said interior cylindrical surface acting to direct the flow of said mixture in said chamber so that at least a portion of said solid particles move preferentially toward said cylindrical surface.

67. The apparatus of claim 63 wherein said inlet means includes at least one flow directing means located in spaced relation to said interior cylindrical surface acting to direct the flow of said mixture in said chamber so that at least a portion of said solid particles move preferentially toward said cylindrical surface.

68. The apparatus of claim 60 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

69. The apparatus of claim 63 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

70. The apparatus of claim 60 wherein said separation means further comprises at least one velocity altering means located in spaced relation to said interior cylindrical surface downstream from said inlet means to change the radial component of the velocity of the mixture of solid particles and vapor flowing past said velocity altering means.

71. The apparatus of claim 63 wherein said separation means further comprises at least one velocity altering means located in spaced relation to said interior cylindrical surface downstream from said inlet means to change the radial component of the velocity of the mixture of solid particles and vapor flowing past said velocity altering means.

72. The apparatus of claim 70 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

73. In a method for at least partially separating a mixture of solid particles and vapor into separate solid (1) particles and (2) vapor, the improvement which comprises causing said mixture to flow into the apparatus of claim 60.

74. In a method for at least partially separating a mixture of solid particles and vapor into separate solid (1) particles and (2) vapor, the improvement which comprises causing said mixture to flow into the apparatus of claim 63.

75. In a method for at least partially separating a mixture of solid particles and vapor into separate solid (1) particles and (2) vapor, the improvement which comprises causing said mixture to flow into the apparatus of claim 64.

76. In a method for at least partially separating a mixture of solid particles and vapor into separate solid (1) particles and (2) vapor, the improvement which comprises causing said mixture to flow into the apparatus of claim 66.

77. In a method for at least partially separating a mixture of solid particles and vapor into separate solid (1) particles and (2) vapor, the improvement which comprises causing said mixture to flow into the apparatus of claim 68.

78. In a method for at least partially separating a mixture of solid particles and vapor into separate solid (1) particles and (2) vapor, the improvement which comprises causing said mixture to flow into the apparatus of claim 70.

79. In an apparatus for at least partially separating a mixture of solid particles and vapor including a chamber defined by an interior cylindrical surface; an inlet means in fluid communication with said chamber to allow entry of said mixture to said chamber, said inlet means being situated so that the movement of said mixture in said chamber causes solid particles to preferentially move toward said cylindrical surface; a fluid outlet means in fluid communication with said chamber to allow at least a portion of said vapor component of said mixture to exit from said chamber; and a particle outlet means in fluid communication with said chamber to allow at least a portion of said solid particles to exit from said chamber; the improvement which comprises a plurality of vanes attached to said interior cylindrical surface to slow the velocity of at least a portion of said solid particles as said solid particles preferentially move toward said cylindrical surface, thereby inhibiting the attrition of said solid particles, each of said vanes being inclined at an angle relative to said central axis of said chamber to reduce the resistance to flow of said solid particles and vapor in said chamber caused by said vanes.

80. The apparatus of claim 79 wherein each of said vanes is inclined at a substantially uniform angle relative to said central axis.

81. The apparatus of claim 79 wherein said vanes are positioned so that each said vane overlaps at least one adjacent vane when viewed from the central axis of said chamber.

82. The apparatus of claim 80 wherein said vanes are positioned so that each said vane overlaps at least one adjacent vane when viewed from the central axis of said chamber.

83. The apparatus of claim 79 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

84. The apparatus of claim 82 wherein said inlet means includes at least one flow reversal means to substantially change the direction of flow of said mixture prior to said mixture entering said chamber to thereby cause at least a portion of said solid particles to be separated from said mixture prior to said mixture entering said chamber and said apparatus further comprising at least one particle withdrawal means in fluid communication with said flow reversal means from transporting said solid particles separated in said flow reversal means from said separation means.

85. The apparatus of claim 79 wherein said inlet means includes at least one flow directing means located in spaced relation to said interior cylindrical surface acting to direct the flow of said mixture in said chamber so that at least a portion of said solid particles move preferentially toward said cylindrical surface.

86. The apparatus of claim 82 wherein said inlet means includes at least one flow directing means located in spaced relation to said interior cylindrical surface acting to direct the flow of said mixture in said chamber so that at least a portion of said solid particles move preferentially toward said cylindrical surface.

87. The apparatus of claim 79 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

88. The apparatus of claim 82 wherein said separation means further comprises at least one plate means located in spaced relation to said interior cylindrical surface between said inlet means and said particle outlet means for collecting at least a portion of said solid particles separated from said mixture in said separation means upstream from said plate means and transport means in fluid communication with said plate means for transporting at least a portion of said solid particles collected by said plate means from said separation means.

89. The apparatus of claim 79 wherein said separation means further comprises at least one velocity altering means located in spaced relation to said interior cylindrical surface downstream from said inlet means to change the radial component of the velocity of the mixture of solid particles and vapor flowing past said velocity altering means.

90. The apparatus of claim 82 wherein said separation means further comprises at least one velocity altering means located in spaced relation to said interior cylindrical surface downstream from said inlet means to change the radial component of the velocity of the mixture of solid particles and vapor flowing past said velocity altering means.

91. The apparatus of claim 89 wherein said separation means further comprises at least one plate means located in spaced relation to said interior cylindrical surface between said inlet means and said velocity altering means for collecting at least a portion of said solid particles separated from said mixture in said separation means upstream from said plate means and transport means in fluid communication with said plate means for transporting at least a portion of said solid particles collected by said plate means from said separation means.

92. In a method for at least partially separating a mixture of solid particles and vapor into separate solid (1) particles and (2) vapor, the improvement which comprises causing said mixture to flow into the apparatus of claim 79.

93. In a method for at least partially separating a mixture of solid particles and vapor into separate solid (1) particles and (2) vapor, the improvement which comprises causing said mixture to flow into the apparatus of claim 82.

94. In a method for at least partially separating a mixture of solid particles and vapor into separate solid (1) particles and (2) vapor, the improvement which comprises causing said mixture to flow into the apparatus of claim 83.

95. In a method for at least partially separating a mixture of solid particles and vapor into separate solid (1) particles and (2) vapor, the improvement which comprises causing said mixture to flow into the apparatus of claim 85.

96. In a method for at least partially separating a mixture of solid particles and vapor into separate solid (1) particles and (2) vapor, the improvement which comprises causing said mixture to flow into the apparatus of claim 87.

97. In a method for at least partially separating a mixture of solid particles and vapor into separate solid (1) particles and (2) vapor, the improvement which comprises causing said mixture to flow into the apparatus of claim 89.

* * * * *